(12) United States Patent
Ishii

(10) Patent No.: US 11,653,091 B2
(45) Date of Patent: May 16, 2023

(54) FOCUS DETECTING APPARATUS AND METHOD USING MULTI-AF FRAME, AND IMAGE PICKUP APPARATUS

(71) Applicant: CANON KABUSHIKI KAISHA, Tokyo (JP)

(72) Inventor: Hirokazu Ishii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/217,328

(22) Filed: Mar. 30, 2021

(65) Prior Publication Data
US 2021/0314481 A1  Oct. 7, 2021

(30) Foreign Application Priority Data
Apr. 3, 2020 (JP) ............................. JP2020-067921

(51) Int. Cl.
 *H04N 5/232* (2006.01)
 *G02B 7/28* (2021.01)
 *G03B 13/36* (2021.01)

(52) U.S. Cl.
 CPC ........... *H04N 5/23212* (2013.01); *G02B 7/28* (2013.01); *G03B 13/36* (2013.01)

(58) Field of Classification Search
 CPC ......... H04N 5/23212; H04N 5/232122; H04N 5/232123; H04N 5/232127; H04N 5/232933; G02B 7/28; G02B 7/34; G03B 13/36
 See application file for complete search history.

(56) References Cited

U.S. PATENT DOCUMENTS

| | | | |
|---|---|---|---|
| 2016/0212323 A1* | 7/2016 | Ishii | G02B 7/36 |
| 2018/0041690 A1* | 2/2018 | Miyazawa | G02B 7/28 |
| 2018/0048805 A1* | 2/2018 | Kawanishi | H04N 5/232122 |
| 2018/0234618 A1* | 8/2018 | Kawarada | H04N 5/357 |
| 2020/0154057 A1* | 5/2020 | Hosokawa | G03B 13/36 |
| 2021/0006708 A1* | 1/2021 | Wada | H04N 5/232123 |

FOREIGN PATENT DOCUMENTS

| | | | |
|---|---|---|---|
| JP | 2014-137567 A | 7/2014 | |
| WO | WO-2019188934 A1 * | 10/2019 | G02B 7/34 |

* cited by examiner

*Primary Examiner* — Padma Haliyur
(74) *Attorney, Agent, or Firm* — Canon U.S.A., Inc. IP Division

(57) ABSTRACT

A focus detecting apparatus includes an acquisition unit configured to acquire a defocus amount using a pair of image signals corresponding to each of a first focus detecting area and a second focus detecting area larger than the first focus detecting area set for each of the plurality of AF frames, a determination unit configured to determine a priority of the plurality of AF frames using the pair of image signals acquired from each of the first and second focus detecting areas, and a selection unit configured to select the AF frame to be focused using the priority.

20 Claims, 13 Drawing Sheets

PIXEL CONFIGURATION FOR NON-IMAGING PLANE PHASE DIFFERENCE METHOD

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 2A

PIXEL CONFIGURATION FOR IMAGING PLANE PHASE DIFFERENCE METHOD

| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
|---|---|---|---|---|---|---|---|---|---|---|---|---|---|---|---|---|---|---|---|
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

FIG. 2B

FOCUS DETECTING APPARATUS AND METHOD USING MULTI-AF FRAME, AND IMAGE PICKUP APPARATUS

BACKGROUND OF THE DISCLOSURE

Field of the Disclosure

The aspect of the embodiments relates to a focus detecting apparatus, an image pickup apparatus, and a focus detecting method, each of which has a phase difference type focus detecting function.

Description of the Related Art

Autofocus (AF) using the imaging plane phase difference detection method (imaging plane phase difference AF hereinafter) moves a focus lens by a moving amount corresponding to a defocus amount calculated from a phase difference between a pair of image signals obtained by receiving light beams that have passed through different exit pupil areas in the imaging optical system. For a stable operation that does not miss the object in a wide range using the imaging plane phase difference AF, it is necessary to set more focus detecting areas in a wider range and at a higher density. It is further necessary to select or calculate a defocus amount used to calculate the moving amount of the focus lens using one or more of the focus detecting areas until the in-focus state is obtained. Japanese Patent Laid-Open No. ("JP") 2014-137567 discloses an image pickup apparatus that selects one of a plurality of focus detecting areas based on a determination result of reliability calculated with each of the plurality of focus detecting areas, so as to provide proper focusing even on an object that is unsuitable for a focus detection, such as a low contrast object.

Display frames (AF frames) displayed on a display unit or the like are arranged so as to enable focus detectable areas and an in-focus position in an image to be visually recognized. The focus detecting area is set in order to lessen a missing object and to prevent focus detecting performance for a low-contrast object from lowering. Hence, the focus detecting areas in the adjacent display frames overlap each other to some extent and have certain dimensions. If the number of AF frames increases while the focus detecting performance is maintained, an overlap amount of the focus detecting areas increases. If an object in an imaging screen is small, even though the object is not included in the AF frame, the object may be considered to belong to the in-focus display frame because it is included in the focus detecting area.

In the image pickup apparatus disclosed in JP 2014-137567, when a plurality of AF frames include the same object in the focus detecting areas, the AF frame that captures the object at the center and the AF frame that captures the object at the edge provide the same reliability. Therefore, it is difficult to select the AF frame that captures the object at a position closer to the center of the focus detecting area.

SUMMARY OF THE DISCLOSURE

A focus detecting apparatus according to one aspect of the embodiments includes an acquisition unit configured to acquire a defocus amount using a pair of image signals corresponding to each of a first focus detecting area and a second focus detecting area larger than the first focus detecting area set for each of the plurality of AF frames, a determination unit configured to determine a priority of the plurality of AF frames using the pair of image signals acquired from each of the first and second focus detecting areas, and a selection unit configured to select the AF frame to be focused using the priority.

A focus detecting method according to another aspect of the embodiments includes the steps of acquiring a defocus amount using a pair of image signals corresponding to each of a first focus detecting area and a second focus detecting area larger than the first focus detecting area set for each of the plurality of AF frames, determining a priority of the plurality of AF frames using the pair of image signals acquired from each of the first and second focus detecting areas, and selecting the AF frame to be focused using the priority.

Further features of the disclosure will become apparent from the following description of exemplary embodiments with reference to the attached drawings.

BRIEF DESCRIPTION OF THE DRAWINGS

FIGS. 2A and 2B illustrate a pixel configuration of the imaging plane phase difference AF.

DESCRIPTION OF THE EMBODIMENTS

Figure 1:
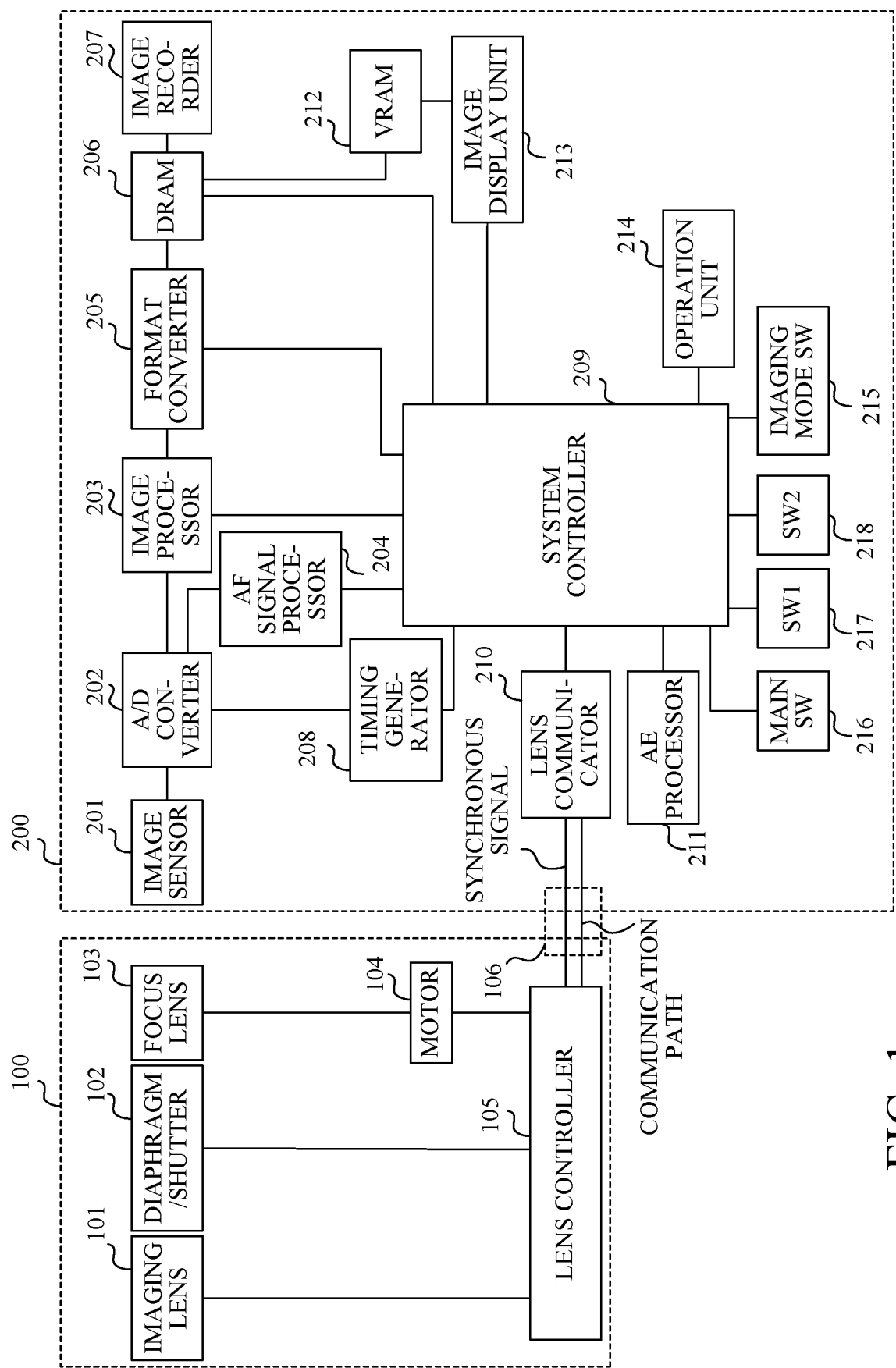
FIG. 1 is a block diagram of an image pickup apparatus according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a block diagram of a camera system according to one embodiment of the disclosure. A lens apparatus (interchangeable lens, imaging optical system) 100 is detachably (interchangeably) attached to a digital camera body (image pickup apparatus) 200 via an unillustrated mount member having an electrical contact unit 106.

The lens apparatus 100 includes an imaging lens 101 including a zoom mechanism, a diaphragm/shutter 102 that controls a light amount, a focus lens 103, a motor 104 that drives the focus lens 103, and a lens controller 105. The focus lens 103 is a focusing unit that focuses light on the image sensor.

The digital camera body 200 includes an image sensor 201, an A/D converter 202, an image processor 203, an AF signal processor 204, a format converter 205, a DRAM 206, an image recorder 207, a timing generator 208, and a system controller (control unit) 209. The DRAM 206 is a high-speed built-in memory such as a random access memory, and used as a high-speed buffer as a temporary image memory, a work memory used to compress and decompress an image, or the like. The image recorder 207 includes a recording medium such as a memory card and its interface.

The digital camera body 200 further includes a lens communicator 210, an AE processor 211, an image display memory (VRAM) 212, an image display unit 213, and an operation unit 214. In addition to displaying an image, the image display unit 213 displays an operation assistance, a camera state, an imaging screen, and AF frames during imaging. The operation unit 214 is a member used to operate the camera from the outside, and includes, for example, a menu switch for making various settings such as an imaging function and a setting for image playback, and an operation mode switch between an imaging mode and a playback mode.

The digital camera body 200 further includes an imaging mode switch 215, a main switch 216, a switch 217 (SW1), and a switch 218 (SW2). The imaging mode switch 215 is a switch that selects an imaging mode such as a macro mode or a sports mode. The main switch 216 is a switch that powers on the camera body 200.

In this embodiment, the focus detecting apparatus includes the AF signal processor 204 and the system controller 209.

The image sensor 201 includes a CCD or CMOS sensor, and captures an object image via the lens apparatus 100. More specifically, light that has passed through the lens apparatus 100 is imaged on the imaging plane (light receiving plane) of the image sensor 201, and converted into a signal charge according to an incident light amount by a photodiode. The signal charge accumulated in each photodiode is sequentially read out of the image sensor 201 as a voltage signal according to a charge amount based on a driving pulse given from the timing generator 208 according to a command from the system controller 209.

Each pixel in the image sensor 201 includes two (a pair of) photodiodes A and B and a single microlens provided for the pair of photodiodes A and B. The pair of photodiodes A and B are configured to receive light fluxes that have passed through different areas in the exit pupil of the imaging lens 101 via the single microlens, and a pair of optical images are formed on the pair of photodiodes A and B. The pair of photodiodes A and B output a pair of image signals (A signal and B signal) used for the AF signals described later. By adding the outputs of the pair of photodiodes A and B to each other, an imaging signal (A+B signal) can be obtained.

A pair of image signals are generated as AF signals (focus detecting signals) used for the imaging plane phase difference AF is obtained by performing addition processing in a direction orthogonal to a pupil dividing direction for each of the plurality of A signals and the plurality of B signals output from the plurality of pixels. The AF signal processor 204 serves as an acquisition unit that acquires a phase difference (referred to as an image shift amount hereinafter) which is a shift amount between the pair of image signals by performing a correlation calculation for the pair of image signals, and then acquires a defocus amount (and defocus direction) of the lens apparatus 100 based on the image shift amount.

FIG. 2A illustrates a pixel configuration that does not support the imaging plane phase difference AF. FIG. 2B illustrates a pixel configuration that supports the imaging plane phase difference AF. Both figures use the Bayer array, where R represents a red color filter, B represents a blue color filter, and Gr and Gb represent a green color filter.

In the pixel configuration illustrated in FIG. 2B, there are two photodiodes A and B divided into two in the horizontal direction in FIG. 2B in the pixel corresponding to one pixel illustrated and surrounded by a solid line in the pixel configuration in FIG. 2A. The pixel dividing method illustrated in FIG. 2B is illustrative, and the pixel may be divided in the vertical direction in FIG. 2B or divided into two in each of the horizontal and vertical directions (four divisions in total). A plurality of types of pixels divided by different division methods may be included in the same image sensor.

The imaging signal and AF signal read out of the image sensor 201 are input to the A/D converter 202. The A/D converter 202 performs correlated double sampling for removing reset noises, a gain control, and a signal digitization for the imaging signal and the AF signal. The A/D converter 202 outputs the imaging signal to the image processor 203, and outputs the AF signal to the AF signal processor 204. The AF signal processor 204 performs a correlation calculation based on the pair of image signals which are the AF signals, calculates a defocus amount, and acquires reliability information (such as a coincidence degree between two images, steepness of the two images, contrast information, saturation information, and scratch information). The calculated defocus amount and reliability information are output to the system controller 209. This embodiment uses the contrast information as the reliability information, but may use a feature amount of the correlation waveform acquired by the correlation calculation.

Figure 3:
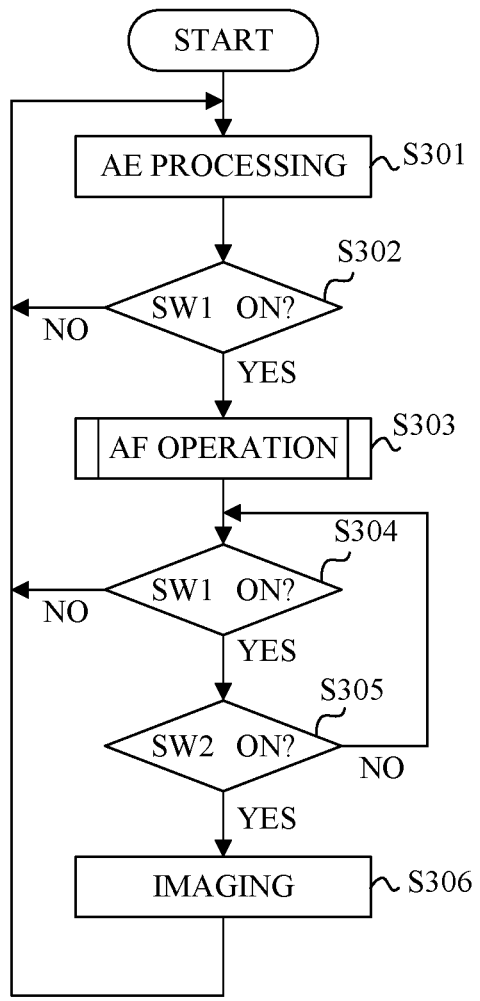
FIG. 3 is a flowchart showing an operation of the image pickup apparatus.

FIG. 3 is a flowchart showing an operation of the image pickup apparatus.

In the step S301, the AE processor 211 performs AE processing from the output of the image processor 203. More specifically, the AE processor 211 calculates an exposure condition based on a photometric value calculated from the output of the image processor 203 and the program diagram stored in advance.

In the step S302, the system controller 209 determines whether or not the switch 217 (SW1) configured to perform an imaging standby operation such as AF and AE (autoexposure) is turned on. If the switch 217 is turned on, the flow proceeds to the step S303, otherwise the flow returns to the step S301.

In the step S303, the AF operation is executed.

In the step S304, the system controller 209 determines whether or not the switch 217 is turned on. If the switch 217 is turned on, the flow proceeds to the step S305, otherwise the flow returns to the step S301.

In the step S305, the system controller 209 determines whether or not the switch 218 (SW2) configured to provide imaging is turned on. If the switch 218 is turned on, the flow proceeds to the step S306, otherwise the flow returns to the step S304.

In the step S306, the imaging operation is executed, and then the flow returns to the step S301.

Figure 4A:
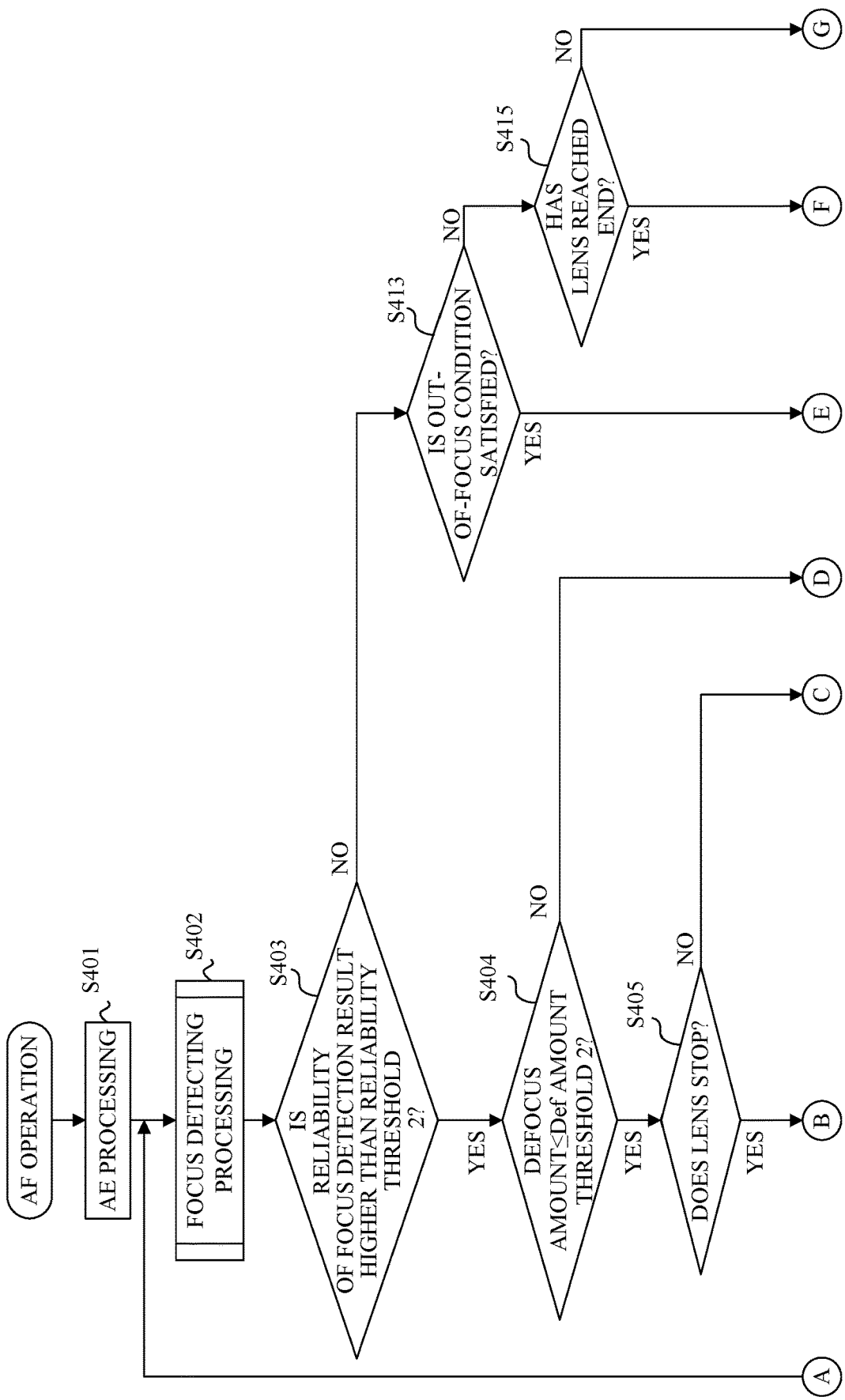
FIGS. 4A and 4B show a flowchart of an AF operation.
Figure 4B:
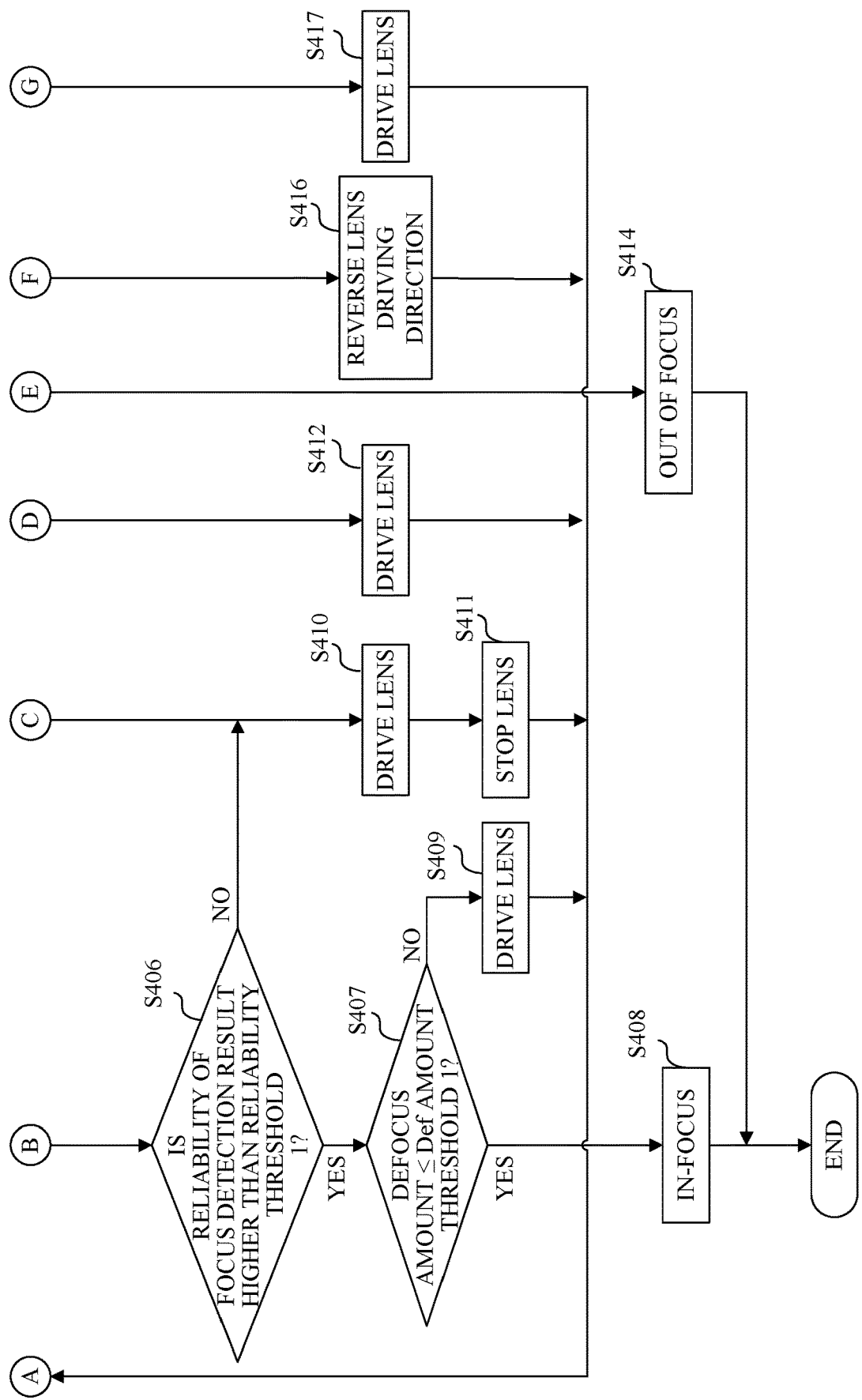

FIG. 4 is a flowchart showing the AF operation in the step S303 in FIG. 3.

In the step S401, the AE processor 211 performs AE processing based on the output of the image processor 203.

In the step S402, the focus detecting processing is executed, and the defocus amount and reliability information (reliability of the focus detecting processing) are acquired.

In the step S403, the system controller 209 determines whether or not the reliability of the focus detecting processing acquired in the step S402 is higher than a preset reliability threshold 2. If the reliability is higher than the reliability threshold 2, the flow proceeds to the step S404, otherwise the flow proceeds to the step S413. The reliability threshold 2 is a value such that when the reliability is less than the reliability threshold 2, the accuracy of the defocus amount cannot be guaranteed but the focus position direction of the object can be guaranteed.

In the step S404, the system controller 209 determines whether or not the defocus amount acquired in the step S402 is equal to or less than a preset Def (defocus) amount threshold 2. If the defocus amount is equal to or less than the Def amount threshold 2, the flow proceeds to the step S405, otherwise the flow proceeds to the step S412. The Def amount threshold 2 is a value (for example, an amount five times as long as the depth of focus) that enables the focus lens 103 to be controlled within the depth of focus within a predetermined number of times (for example, three times).

In the step S405, the system controller 209 determines whether or not the focus lens 103 stops. If the focus lens 103 stops, the flow proceeds to the step S406, otherwise the flow proceeds to the step S410.

In the step S406, the system controller 209 determines whether or not the reliability acquired in the step S402 is higher than a preset reliability threshold 1. If the reliability is higher than the reliability threshold 1, the flow proceeds to the step S407, otherwise the flow proceeds to the step S410. The reliability threshold 1 is a value such that if the reliability is equal to or more than the reliability threshold 1, the accuracy variation of the defocus amount falls within a predetermined range (for example, within the depth of focus).

In the step S407, the system controller 209 determines whether or not the defocus amount acquired in the step S402 is equal to or less than a preset Def amount threshold 1. If the defocus amount is equal to or less than the Def amount threshold 1, the flow proceeds to the step S408, otherwise the flow proceeds to the step S409. The Def amount threshold 1 is an in-focus determination width used to determine whether or not the focus lens 103 is controlled within an in-focus range.

In the step S408, the system controller 209 determines that it is in the in-focus state and ends this flow.

In the step S409, the system controller 209 instructs the lens controller 105 to drive the focus lens 103 by the defocus amount acquired in the step S402 via the lens communicator 210. That is, in this embodiment, the system controller 209 serves as a control unit configured to instruct driving of the focus lens 103. Then, the flow returns to the step S402.

By performing a series of processing in the steps S405 to S409, when the reliability acquired in the step S402 is higher than the reliability threshold 1, the defocus amount can be acquired again while the focus lens 103 is stopped.

In the step S410, the system controller 209 instructs the lens controller 105 via the lens communicator 210 to drive the focus lens 103 by an amount obtained by multiplying the defocus amount acquired in the step S402 by a predetermined ratio.

In the step S411, the system controller 209 instructs the lens controller 105 to stop the focus lens 103 via the lens communicator 210. Then, the flow proceeds to the step S402.

In the step S412, the system controller 209 instructs the lens controller 105 via the lens communicator 210 to drive the focus lens 103 by an amount obtained by multiplying the defocus amount acquired in the step S402 by a predetermined ratio. Then, the flow proceeds to the step S402.

The predetermined ratios in the steps S410 and S412 are set, for example, to 80% so that the driving amount of the focus lens 103 is smaller for the defocus amount. For example, the driving speed of the focus lens 103 is set to be slower than that at which the focus lens can reach the target position before the focus detecting processing is completed in the next frame. This configuration can prevent the focus lens from passing the object focus position when the acquired defocus amount is incorrect, and can drive the focus lens 103 next time without stopping the focus lens 103 (overlap control).

In the step S413, the system controller 209 determines whether or not an out-of-focus condition is satisfied. If the out-of-focus condition is satisfied, the flow proceeds to the step S414, otherwise the flow proceeds to the step S415. The out-of-focus condition is a condition used to determine that there is no object to be focused.

In the step S414, the system controller 209 determines that it is out of focus and ends this flow.

In the step S415, the system controller 209 determines whether or not the focus lens 103 has reached any one of lens ends. If the focus lens 103 reaches any one of lens ends, the flow proceeds to the step S416, otherwise the flow proceeds to the step S417.

In the step S416, the system controller 209 instructs the lens controller 105 to reverse the driving direction of the focus lens 103 via the lens communicator 210. Then, the flow proceeds to the step S402.

In the step S417, the system controller 209 instructs the lens controller 105 to drive the focus lens 103 in a predetermined direction via the lens communicator 210. Then, the flow proceeds to the step S402.

The driving speed of the focus lens 103 in the steps S416 and S417 are set, for example, to the fastest speed within a speed range in which the focus lens does not pass the focus position when the defocus amount becomes detectable.

Figure 5:
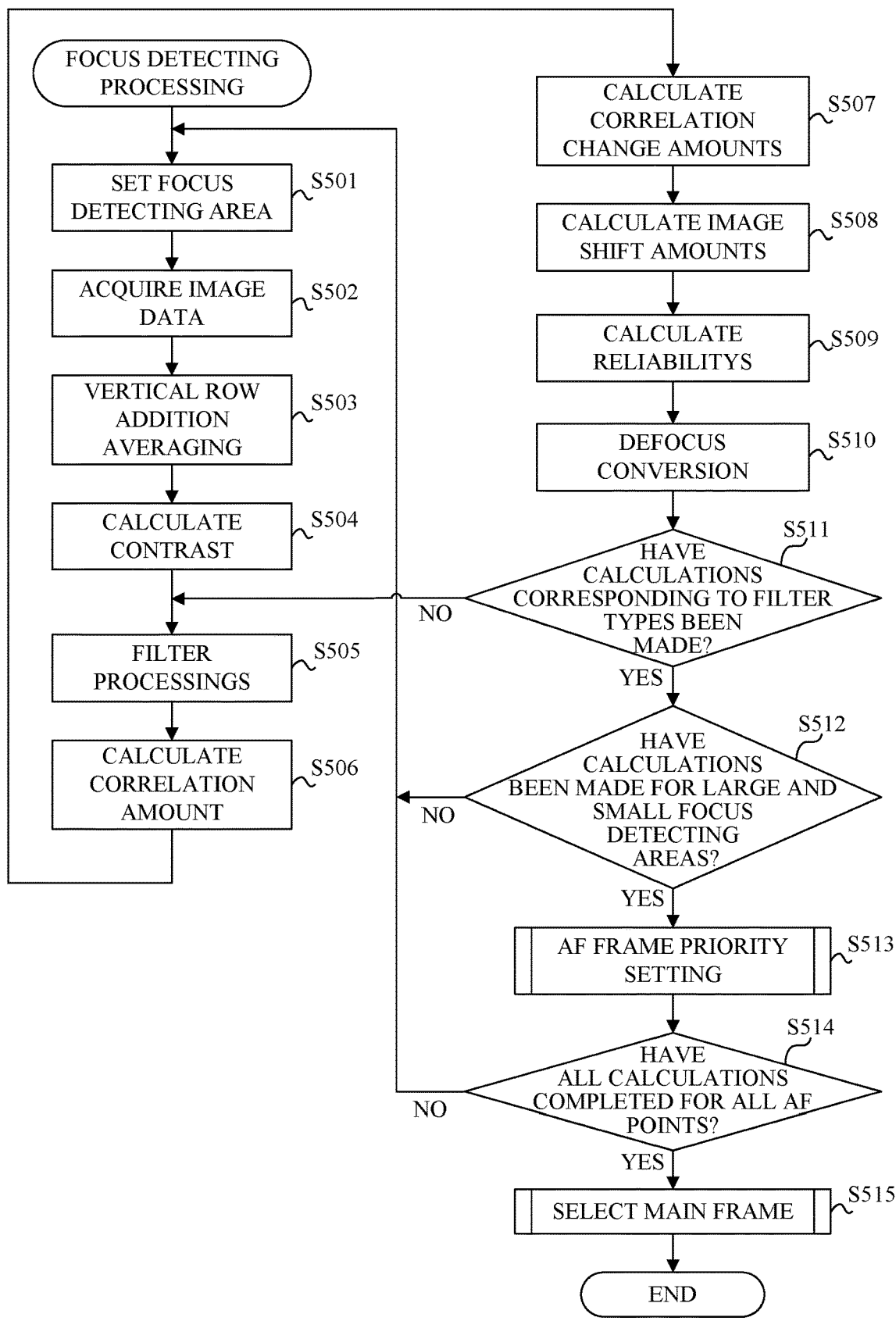
FIG. 5 is a flowchart showing focus detecting processing.

FIG. 5 is a flowchart showing the focus detecting processing in the step S402 of FIG. 4.

In the step S501, a focus detecting area corresponding to an arbitrary range in the image sensor 201 is set.

In the step S502, a pair of image signals (A and B images) for the focus detection are acquired from the signals output from the image sensor 201 corresponding to the focus detecting area set in the step S501.

In the step S503, row addition averaging processing of the pair of image signals acquired in the step S502 in the vertical direction is performed. This processing can reduce the noise influence on the image signal.

In the step S504, contrast information is acquired from each of the pair of image signals or the added signal. The contrast information includes a value that is an index of the contrast of the image signal such as a maximum value (Peek), a minimum value (Bottom), a crest (Peek-Bottom), or a crest value/maximum value of the image signal.

In the step S505, filter processing is performed to extract a signal component in a predetermined frequency band from the signal obtained by the vertical row addition averaging in the step S503.

In the step S506, a correlation amount is calculated from the signal filtered in the step S505.

In the step S507, a correlation change amount is calculated from the correlation amount calculated in the step S506.

In the step S508, an image shift amount is calculated from the correlation change amount calculated from the step S506.

In the step S509, the reliability indicating the reliability of the image shift amount calculated in the step S508 is calculated.

In the step S510, the image shift amount is converted into the defocus amount.

In the step S511, it is determined whether or not calculations corresponding to filter types have been made in the filter processing performed in the step S505. If the calculations corresponding to the filter types have been made, the flow proceeds to the step S512, otherwise the flow returns to the step S505. In the filter processing in the step S505, for example, processing with bandpass filters having a plurality of different frequency bands is made for the signal obtained by the vertical row addition averaging. In the step S510, it is determined whether or not a series of processing of the steps S504 to S509 has been made for all types of frequency bands.

In the step S512, it is determined whether or not similar calculations for a plurality of types of frame areas (for large and small focus detecting areas) have been completed in the area corresponding to each AF frame. If the calculations have been completed, the flow proceeds to the step S513, otherwise the flow returns to the step S501.

In the step S513, a priority for selecting the main frame is set as a preliminary step for selecting the main frame for specifying a position of an AF frame to be focused on the entire surface. In this embodiment, the system controller 209 serves as a determination unit configured to determine the priority of a plurality of AF frames.

Figure 6:
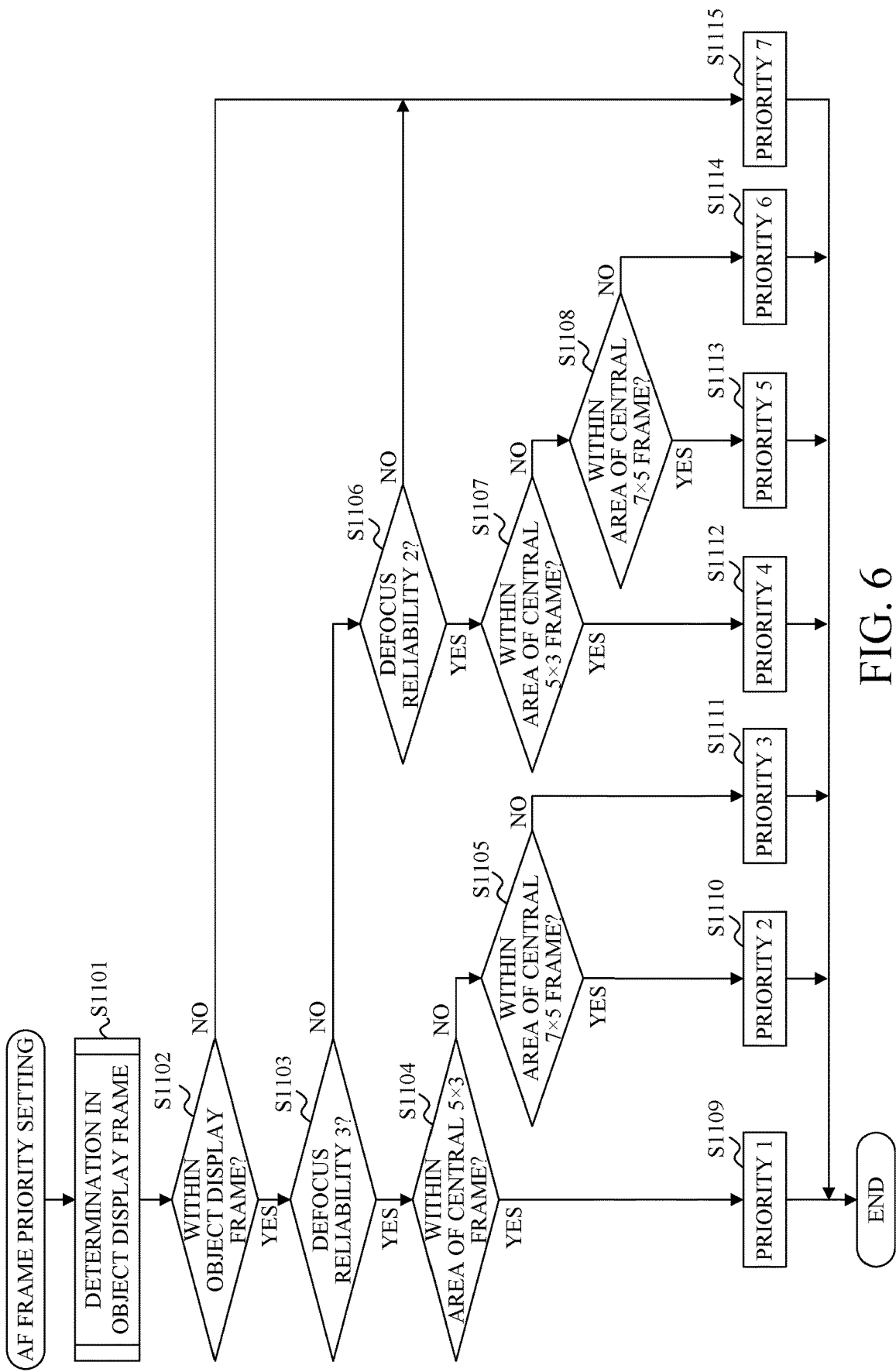
FIG. 6 is a flowchart showing priority setting processing for selecting a main frame.

FIG. 6 is a flowchart showing priority setting processing for selecting the main frame.

In the step S1101, a determination in the object display frame is made. The determination in the object display frame is a method for determining how many high contrast components exist near the center of the focus detecting area for the focus detecting area of each AF frame, and the determination is made based on a relative relationship of the calculation results of large and small focus detecting areas in each AF frame.

In an example, this embodiment will discuss an implementation method based on a relative relationship of the contrast information. If a small focus detecting area that is relatively as large as the AF frame has an extremely low contrast and a large focus detecting area that corresponds to the AF frame has a high contrast, the contrast component is likely to be located at the edge of the focus detecting area for the target frame. In this AF frame arrangement, the defocus detection result significantly fluctuates due to the object detection based on the defocus state, and if the target frame is selected as the main frame, the focus detection result may be incorrect or the out-of-focus state is likely detected. In addition, when a high contrast object is captured at the edge of the focus detecting area in the target frame, it is likely that the adjacent AF frame can capture the contrast in an area closer to the center of the focus detecting area, a proper main frame in order to reduce the frequency of the output of the erroneous focus detection result is selected. The contrast information for the above method can use an evaluation value EvaValue expressed by the following expression (1) so as to evaluate the low contrast state:

$$\text{EvaValue}=(\text{Peak}-\text{Bottom})/(\text{Peak}) \tag{1}$$

where Peak represents a maximum value of the focus detecting signal, and Bottom represents a minimum value of the focus detecting signal. That is, "Peek-Bottom" represents a crest value. This embodiment uses the focus detecting signal, but may use the imaging signal at the same position.

The evaluation value EvaValue is acquired for each large and small focus detecting areas in each AF frame. The determination in the object display frame determines that it is "false" representing that there is no high contrast object in the AF frame when determining that an evaluation value EvaValue1 for the large focus detecting area and an evaluation value EvaValue2 for the small focus detecting area satisfy the conditions expressed by the following expressions (2) and (3), otherwise determines that it is "true."

$$\text{EvaValue1} \geq \text{CntTh1} \tag{2}$$

$$\text{EvaValue2} < \text{CntTh2} \tag{3}$$

where CntTh1 is a threshold used to determine that there is a high contrast object, and set to about 0.5 in this embodiment, and CntTh2 is a threshold used to determine that there is an extremely low contrast object and set to about 0.1 in this embodiment.

While this embodiment performs the determination in the object display frame using the expression (1), the disclosure is not limited to this embodiment. For example, the determination may be made with a value used to evaluate the object contrast arrangement, such as contrast information ABSCNT expressed by the following expression (4):

$$\text{ABSCNT}=\Sigma(S_{i+1}-S_i) \tag{4}$$

where S is a focus detecting signal.

This embodiment performs the determination in the object display frame using the contrast information, but may perform the determination using the relative relationship of the reliabilities of the large and small focus detecting areas in the calculations such as the correlation calculation.

In the steps S1102 to S1115, the priority of selecting the main frame is determined by priorities 1 to 7 based on the determination in the object display frame, the reliability of the acquired defocus amount, and the AF frame position. When the priority settings for all AF frames have been completed, the flow proceeds to the step S514 in FIG. 5. The arrangement of the AF frame and the like will be described later.

In the step S514, it is determined whether or not similar calculations have been completed for all AF frames. If the calculations have been completed, the flow proceeds to the step S515, otherwise the flow returns to the step S502.

In the step S515, at least one AF frame is selected for the main frame located at the object position to be focused, based on the priority setting result in the step S513 from among the plurality of AF frames calculated by the series of processing of the steps S501 to S513. In the main frame selection, the closest frame is set to the main frame from among the AF frames of respective priorities according to the results set to priorities 1 to 7 in the step S513. The main frame is selected by carrying out this selection work in order of the priorities 1 to 7. When the main frame is selected in this step, the focus detecting processing ends. In this embodiment, the system controller 209 serves as a selection unit configured to select the AF frame to be focused.

Figure 7A:
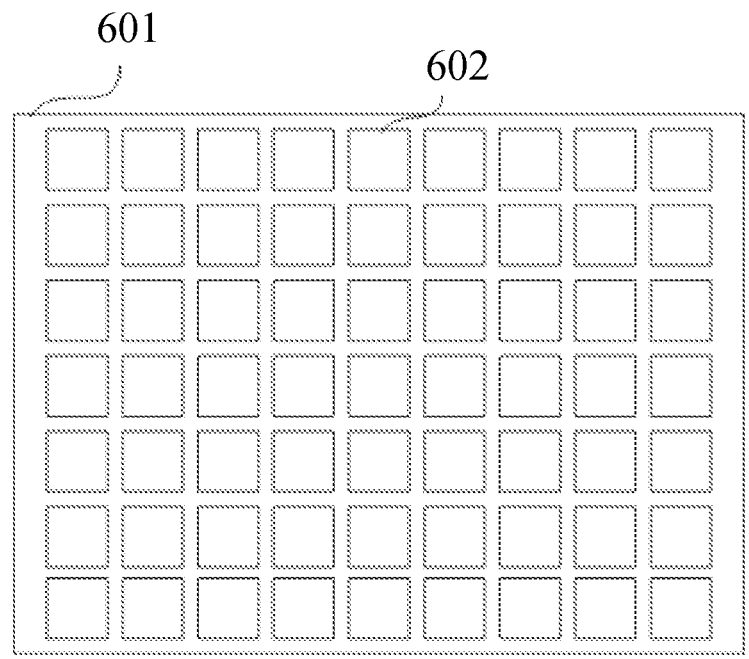
FIGS. 7A and 7B illustrate a focus detecting area used for the focus detecting processing.
Figure 7B:
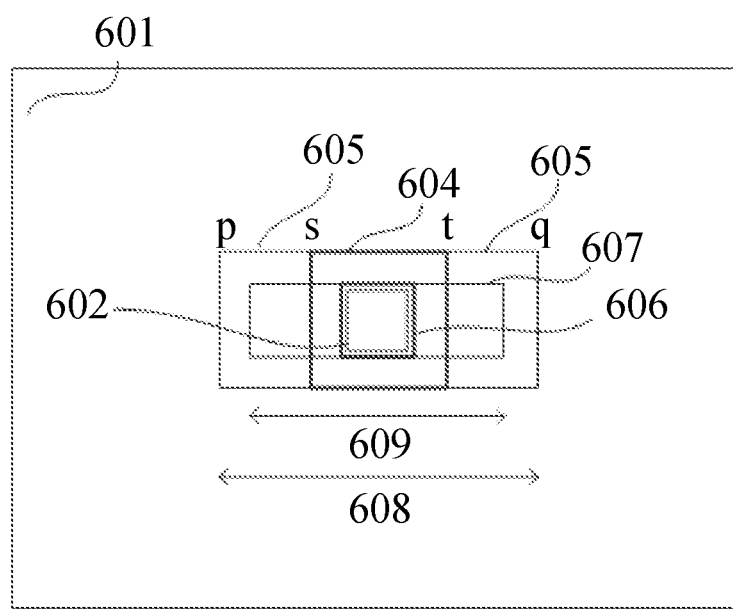

FIGS. 7A and 7B explain a focus detecting area used in the focus detecting processing. FIG. 7A illustrates an illustrative AF frame 602 displayed when the focus detecting processing is performed at a plurality of positions on a pixel array 601 of the image sensor 201, and superimposed on a live-view image such as a rear liquid crystal display. In this embodiment, the system controller 209 serves as an AF frame setting unit configured to two-dimensionally set a plurality of AF frames on the imaging plane of the image sensor 201. FIG. 7B illustrates a relationship between the AF frame and the focus detecting area.

The AF frame 602 is one of the plurality of AF frames arranged in FIG. 7A. This embodiment sets a plurality of types of focus detecting areas corresponding to the AF frame 602, and the set focus detecting areas include at least a first focus detecting area (small focus detecting area) and a second focus detecting area larger than the first focus detecting area (large focus detecting area). An area of a combination of a large focus detecting area 604 and a shift area 605 is a pixel area required for the correlation calculation of the large focus detecting area. Each of p, q, s, and t in FIG. 7B represents a coordinate in the horizontal direction (x-axis direction). The coordinates p and q indicate the x-coordinates of a starting point and an ending point of the pixel area, and the coordinates s and t indicate the x-coordinates of a starting point and an ending point of the focus detecting area 604, respectively. An area of a combination of a small focus detecting area 606 and a shift area 607 is a pixel area required for the correlation calculation of the small focus detecting area. In making calculations using a plurality of focus detecting areas for each AF frame, the small focus detecting area may be an area that is approximately accords with the size of the displayed AF frame. This embodiment performs the focus detecting calculations using the large and small focus detecting areas for each AF frame, and sets the selection priority for each AF frame that is required in selecting the AF frame, based on the relative relationship of the reliability for the large and small focus detecting areas. Further, in this embodiment, the system controller 209 serves as a focus detecting area setting unit configured to set a plurality of focus detecting areas having different sizes for each of the plurality of AF frames.

Figure 8A:
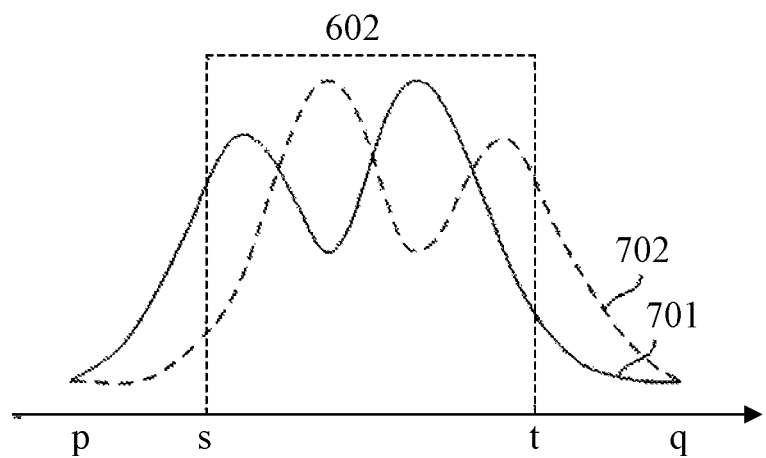
FIGS. 8A to 8C illustrate an image signal obtained from a focus detecting area in FIGS. 7A and 7B.
Figure 8B:
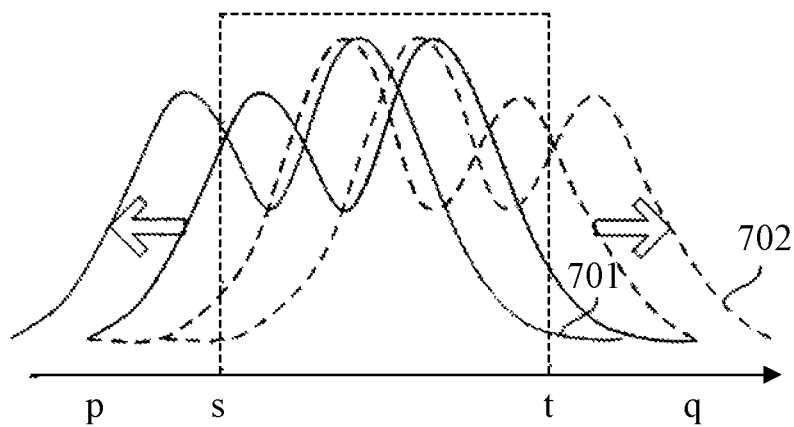
Figure 8C:
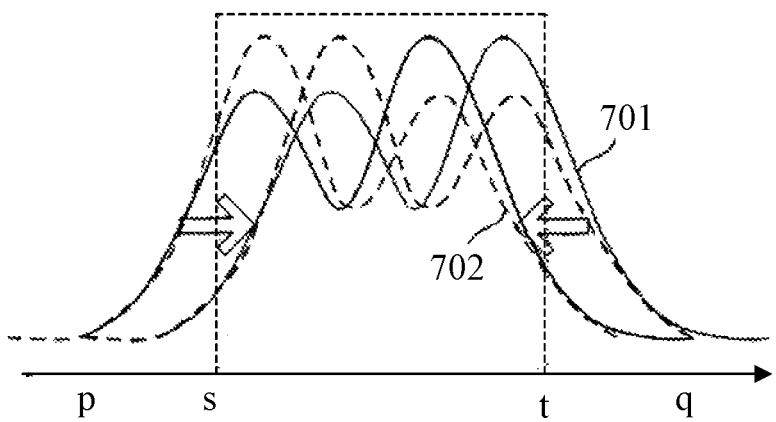

FIGS. 8A to 8C illustrate a pair of image signals obtained from a plurality of pixels included in the focus detecting area 604 in FIG. 7B. A solid line 701 represents one image signal A, and a broken line 702 represents the other image signal B. FIG. 8A illustrates the pre-shift image signals A and B. FIGS. 8B and 8C illustrate a state in which the image signals A and B are shifted from the state in FIG. 8A in the plus direction and the minus direction, respectively. In calculating the correlation amount between the image signals A and B, both the image signals A and B are shifted by 1 bit in the arrow direction.

Next follows a description of a method of calculating the correlation amount. First, as illustrated in FIGS. 8B and 8C, the image signals A and B are shifted by 1 bit each, and the sum of the absolute values of the differences between the image signals A and B is calculated. A correlation amount COR is calculated by the following expression (5):

$$COR[i] = \sum_{k=x}^{y} |A[k+i] - B[k-i]| \quad (5)$$

$$\{(p-s) < i < (q-t)\}$$

where i is a shift amount, p–s is a maximum shift amount in the minus direction, q–t is a maximum shift amount in the plus direction, x is a starting coordinate of the focus detecting area 604, and y is an ending coordinate of the focus detecting area 604.

Figure 9A:
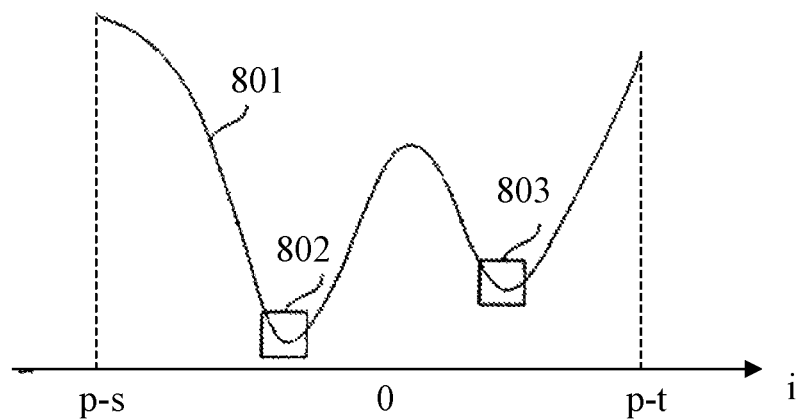
FIGS. 9A and 9B illustrate a relationship between a shift amount and a correlation amount of an image signal in FIGS. 8A to 8C.
Figure 9B:
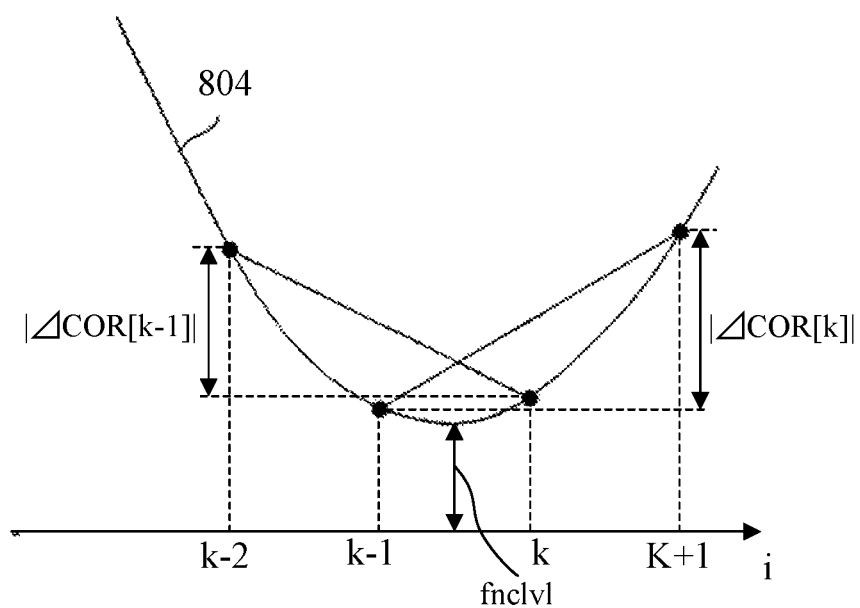

FIGS. 9A and 9B illustrate a relationship between a shift amount in FIGS. 8A to 8C and a correlation amount of the image signal. FIG. 9A illustrates an illustrative relationship between the shift amount and the correlation amount COR. The abscissa axis indicates the shift amount, and the ordinate axis indicates the correlation amount COR. Among parts 802 and 803 near extreme values in the correlation amount 801 that changes with the shift amount, the coincidence degree of the pair of image signals A and B is the highest in the shift amount corresponding to a smaller correlation amount.

Next follows a description of a method of calculating a correlation change amount. A difference in the correlation amount at every other shift in the waveform of the correlation amount 801 in FIG. 9A is calculated as the correlation change amount. The correlation change amount ΔCOR is calculated by the following expression (6):

$$\Delta COR[i] = COR[i-1] - COR[i+1]$$

$$\{(p-s+1) < i < (q-t-1)\} \quad (6)$$

where i is a shift amount, p–s is a maximum shift amount in the minus direction, and q–t is a maximum shift amount in the plus direction.

Figure 10A:
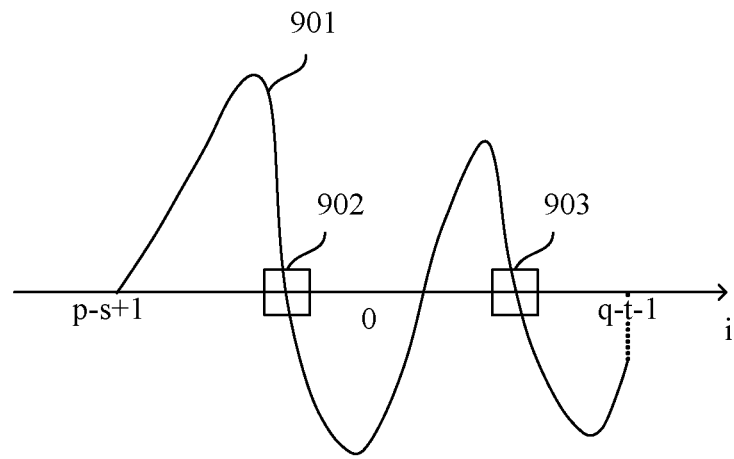
FIGS. 10A and 10B illustrate a relationship between the shift amount and a correlation change amount of the image signal in FIGS. 8A to 8C.
Figure 10B:
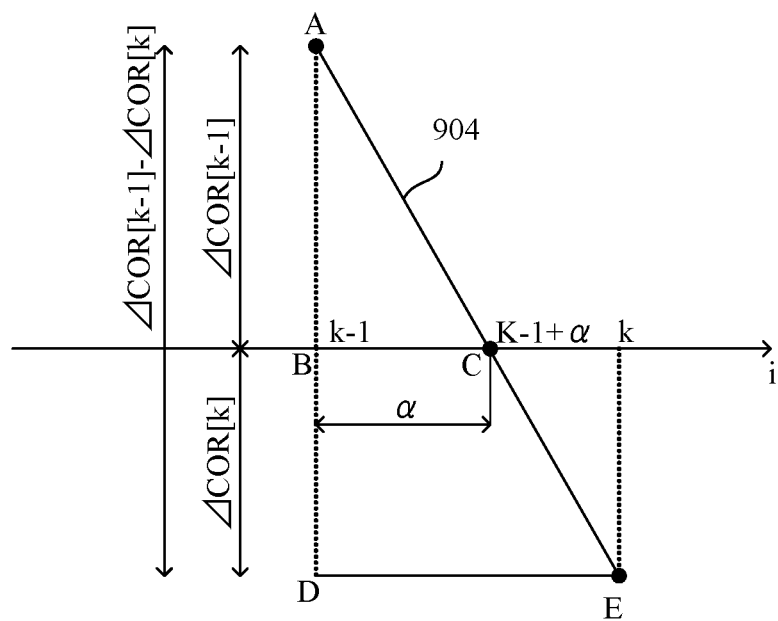

FIGS. 10A and 10B illustrate a relationship between the shift amount of the image signal in FIGS. 8A to 8C and the correlation change amount. FIG. 10A illustrates an illustrative relationship between the shift amount and the correlation change amount ΔCOR. The abscissa axis represents the shift amount, and the ordinate axis represents the correlation change amount ΔCOR. A correlation change amount 901 that changes with the shift amount changes from plus to minus at parts 902 and 903. The state in which the correlation change amount is 0 is called a zero cross, and the coincidence degree between the pair of image signals A and B is the highest. Thus, the shift amount that gives the zero cross is the image shift amount.

FIG. 10B is an enlarged view of the part 902 in FIG. 10A. Reference numeral 904 denotes part of the correlation change amount 901. A method of calculating an image shift amount PRD will be described with reference to FIG. 10B.

A shift amount (k−1+α) that gives the zero cross is divided into an integer part β (=k−1) and a decimal part α. The decimal part α is calculated by the following expression (7) based on a similarity relationship between a triangle ABC and a triangle ADE in FIG. 10B:

$$AB:AD = BC:DE \quad (7)$$

$$\Delta COR[k-1] : \Delta COR[k-1] - \Delta COR[k] = a : k - (k-1)$$

$$\alpha = \frac{\Delta COR[k-1]}{\Delta COR[k-1] - \Delta COR[k]}$$

The integer part β is calculated by the following expression (8).

$$\beta = k-1 \quad (8)$$

An image shift amount PRD can be calculated from the sum of the decimal part α and the integer part β. As illustrated in FIG. 10A, when there are a plurality of zero crosses of the correlation change amount ΔCOR, one having a larger changing steepness of the correlation change amount ΔCOR is defined as a first zero cross. This steepness is an index showing the AF facility, and the larger the value is, the easier accurate AF is. Steepness maxder is calculated by the following expression (9):

$$maxder = |\Delta COR[k-1]| + |\Delta COR[k]| \quad (9)$$

Thus, when there are a plurality of zero crosses of the correlation change amount ΔCOR, the first zero cross is determined by the steepness, and the shift amount that gives the first zero cross is set to the image shift amount.

Figure 11:
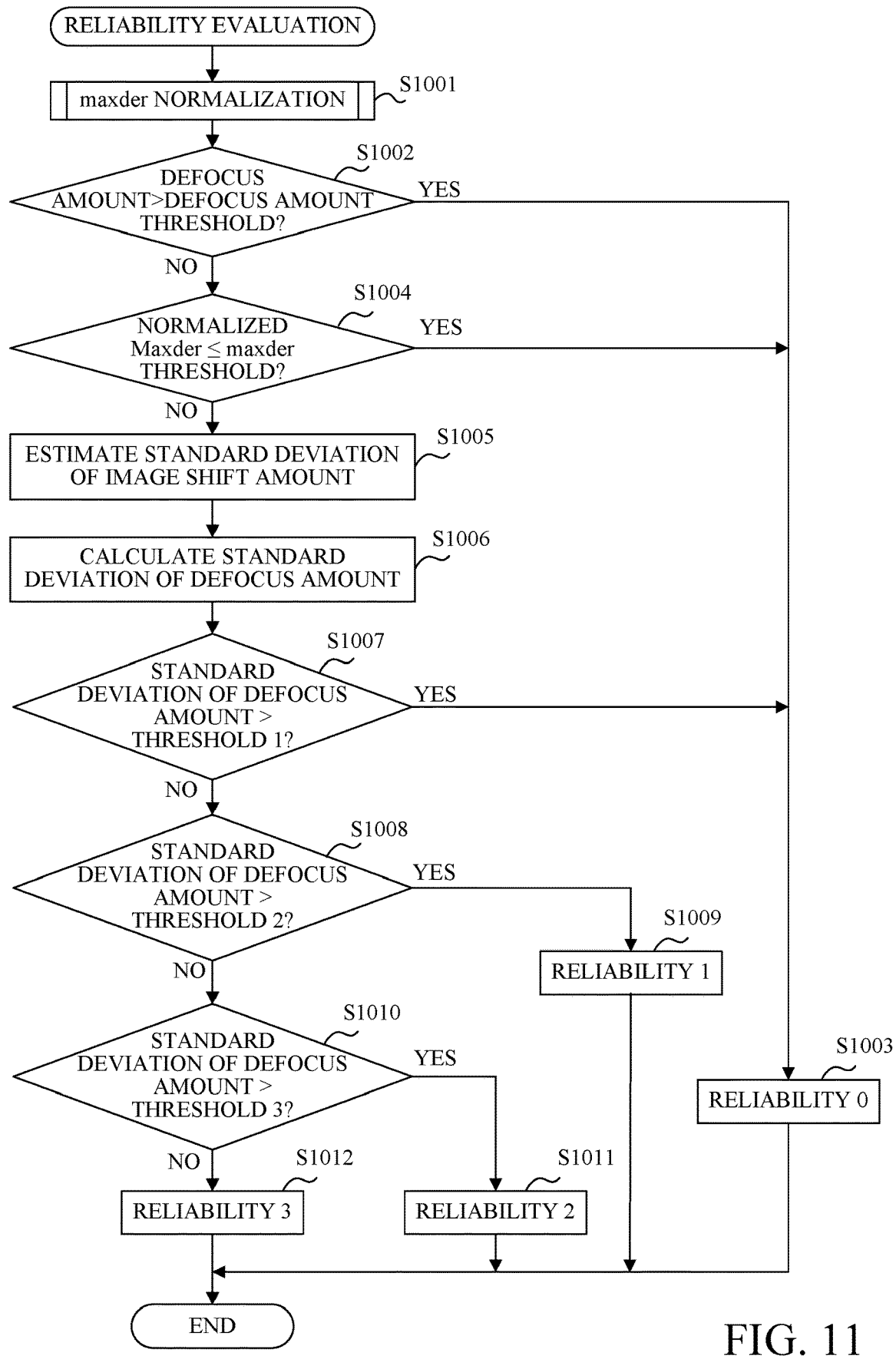
FIG. 11 is a flowchart showing a reliability evaluating method.

A description will be given of an evaluation method of the reliability calculated in the step S509 in FIG. 5. FIG. 11 is a flowchart showing a reliability evaluating method. In this embodiment, the reliability is evaluated by four stages.

In the step S1001, in order to improve the accuracy of the reliability, the steepness maxder is normalized by the imaging condition (such as a sensor gain, and a read row addition number) and an object condition (such as the contrast).

In the step S1002, it is determined whether or not the defocus amount acquired in the step S510 is larger than a defocus amount threshold. If the defocus amount is larger than the defocus amount threshold, the flow proceeds to the step S1003, otherwise the flow proceeds to the step S1004.

In the step S1003, the reliability is set to 0. When the reliability is set to 0, the reliability of the defocus amount is evaluated as low, and this flow ends.

In the step S1004, it is determined whether or not the steepness maxder (normalized maxder) normalized in the step S1001 is equal to or less than a maxder threshold. If the normalized steepness maxder is equal to or less than the maxder threshold, the flow proceeds to the step S1003, otherwise the flow proceeds to the step S1005.

This embodiment sets the defocus amount threshold and the maxder threshold for each filter. The defocus amount threshold is set according to the defocus amount detecting ability of each filter. In addition, in situations where an erroneous reliability is likely output, such as when the object has a low luminance or low contrast, the normalized maxder becomes small, so the erroneous reliability is prevented from being output by setting the maxder threshold.

Figure 12:
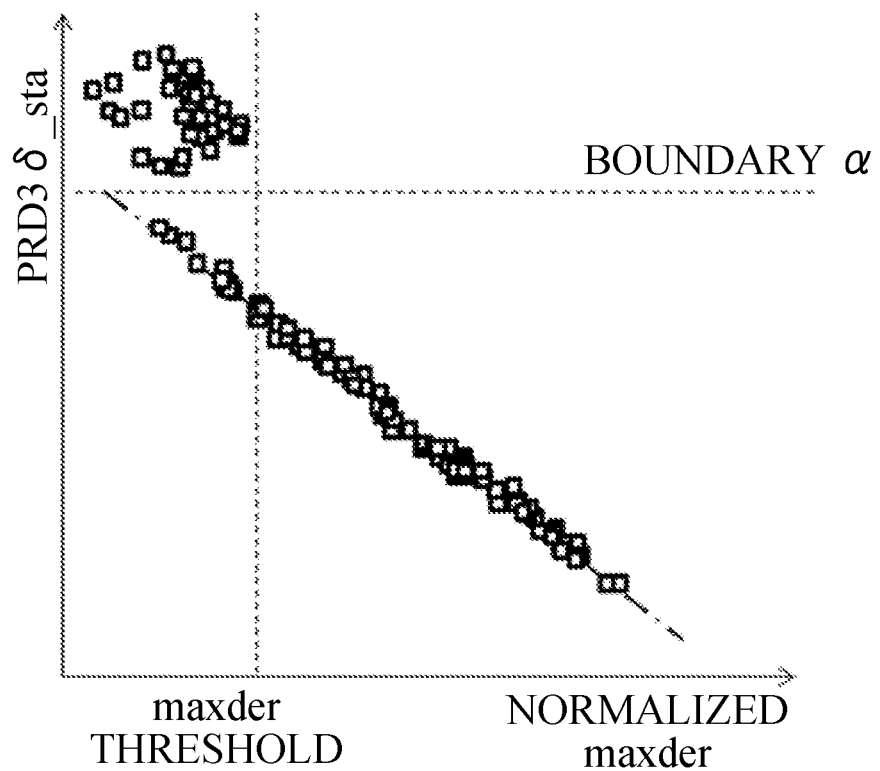
FIG. 12 illustrates a relationship between steepness and a standard deviation of the image shift amount.

In the step S1005, a standard deviation of the image shift amount is estimated based on the normalized maxder. Since there is a negative correlation between the normalized maxder and the standard deviation of the image shift amount as illustrated in FIG. 12, the standard deviation of the image shift amount can be estimated from the normalized maxder.

In the step S1006, the standard deviation of the defocus amount is calculated by multiplying the standard deviation of the image shift amount by a predetermined conversion coefficient. Similar to the conversion coefficient used to calculate the defocus amount from the shift amount between the two images, the conversion coefficient is determined based on the F-number (aperture value) of the diaphragm, the exit pupil distance of the imaging lens, individual information of the image sensor, and the coordinate used to set the focus detecting area. The standard deviation of the defocus amount is also normalized by dividing the F-number F and the permissible circle of confusion 6. If the reliability (standard deviation of the defocus amount) is evaluated based on the steepness maxder, thresholds by the number of conversion coefficients is to be set. This embodiment can set a more desired threshold without storing a large amount of threshold data. In addition, the normalization using the F-number F can set the threshold regardless of the state of the diaphragm. The reliability of the defocus amount is evaluated according to the standard deviation of the defocus amount calculated as described above. This embodiment sets three thresholds (Threshold 1, Threshold 2, and Threshold 3) for the standard deviation of the defocus amount. Threshold 1, Threshold 2, and Threshold 3 are larger in this order.

In the step S1007, it is determined whether or not the standard deviation of the defocus amount is larger than Threshold 1. If the standard deviation of the defocus amount is larger than Threshold 1, the flow proceeds to the step S1003, otherwise the flow proceeds to the step S1008.

In the step S1008, it is determined whether the standard deviation of the defocus amount is larger than Threshold 2. If the standard deviation of the defocus amount is larger than Threshold 2, the flow proceeds to the step S1009, otherwise the flow proceeds to the step S1010.

In the step S1009, the reliability is set to 1.

In the step S1010, it is determined whether the standard deviation of the defocus amount is larger than Threshold 3. If the standard deviation of the defocus amount is larger than Threshold 3, the flow proceeds to the step S1011. If not, the flow proceeds to the step S1012.

In the step S1011, the reliability is set to 2.

In the step S1012, the reliability is set to 3.

As described above, the focus detecting processing in the AF operation and the evaluation of the reliability of the defocus amount as the internal processing of the focus detecting processing, and then the method of selecting the main frame for the plurality of AF frames have been explained.

This embodiment has discussed a method of selecting a main frame from the result of the determination in the object display frame for the plurality of AF frames, but this method may be performed according to the operation of the camera and the state of the object.

In an example, the method can be properly executed by validating or invalidating the result of the determination in the object display frame depending on the operating state of the object, such as whether the object is still or moving. Regarding the accurate display of the display frame in the depth of focus, it is a more effective method to check focusing on a still object, whereas it is more effective method for a moving object to provide a display that prioritizes the continuous focus detection result of the missing object and to use a display frame that prioritizes the continuity than an accurate display within a depth of focus.

Alternatively, the method can be executed in a more appropriate situation by validating and invalidating the result of the determination in the object display frame according to the setting result of AF frames arranged by the user and the result of automatic object detection. The user can set an AF method of arranging a single or a small number of frames at an arbitrary position or positions or an AF method of arranging a plurality of AF frames in a relatively wide area from the camera menu. In the method of arranging a single or a small number of frames at an arbitrary position or positions, the user positively specifies the position to be focused on the screen, so the position does not necessarily accord with the position of the main frame selected from the result of the determination in the object display frame. Therefore, this AF method invalidates the result of the determination in the object display frame, and the other AF methods validates it so as to provide a proper control.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiment can provide a focus detecting apparatus, an image pickup apparatus, and a focus detecting method, each of which can realize a proper focus detecting operation.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-067921, filed on Apr. 3, 2020 which is hereby incorporated by reference herein in its entirety.

What is claimed is:

1. A focus detecting apparatus comprising:
at least one processor; and
at least one memory coupled to the at least one processor storing instructions that, when executed by the at least one processor, cause the at least one processor to function as:
an acquisition unit configured to acquire a defocus amount using a pair of image signals corresponding to each of a first focus detecting area and a second focus detecting area larger than the first focus detecting area set for each of a plurality of AF frames, the first and second focus detection areas each including the corresponding AF frame thereinside;
a determination unit configured to determine a priority of the plurality of AF frames using the pair of image signals acquired from each of the first and second focus detecting areas; and
a selection unit configured to select the AF frame to be focused using the priority,
wherein for each AF frame, based on the pair of image signals acquired from each of the first and second focus detection areas corresponding to the AF frame, the determination unit determines whether or not a predetermined object is included within the AF frame, and by using results of these determinations, the determination unit determines the priority of the plurality of AF frames.

2. The focus detecting apparatus according to claim 1, wherein the pair of image signals are acquired based on signals generated by an image sensor.

3. The focus detecting apparatus according to claim 2, wherein the image sensor captures an object image via an imaging optical system that includes a focus lens.

4. The focus detecting apparatus according to claim 3, wherein the at least one processor further functions as a control unit configured to control moving of the focus lens based on the defocus amount corresponding to the selected AF frame.

5. The focus detecting apparatus according to claim 1, wherein reliability of the defocus amount includes contrast information based on the acquired pair of image signals.

6. The focus detecting apparatus according to claim 5, wherein the contrast information includes a maximum value of a pair of focus detecting signals based on the acquired pair of image signals.

7. The focus detecting apparatus according to claim 5, wherein the contrast information includes a ratio of a crest value and a maximum value of a pair of focus detecting signals based on the acquired pair of image signals.

8. The focus detecting apparatus according to claim 1, wherein the acquisition unit performs a correlation calculation for calculating a phase difference between a pair of focus detecting signals based on the pair of image signals, and
wherein reliability of the defocus amount is a feature amount of a correlation waveform acquired by the correlation calculation.

9. The focus detecting apparatus according to claim 1, wherein the at least one processor further functions as an AF frame setting unit configured to two-dimensionally set the plurality of AF frames.

10. The focus detecting apparatus according to claim 1, wherein the at least one processor further functions as a focus detecting area setting unit configured to set the first and second focus detecting areas.

11. An image pickup apparatus comprising:
An image sensor configured to captures an object image via an imaging optical system including a focus lens; and
a focus detecting apparatus,
wherein the focus detecting apparatus includes:
at least one processor; and
at least one memory coupled to the at least one processor storing instructions that, when executed by the at least one processor, cause the at least one processor to function as:
an acquisition unit configured to acquire a defocus amount using a pair of image signals corresponding to each of a first focus detecting area and a second focus detecting area larger than the first focus detecting area set for each of plurality of AF frames, the first and second focus detection areas each including the corresponding AF frame thereinside;
a determination unit configured to determine a priority of the plurality of AF frames using the pair of image signals acquired from each of the first and second focus detecting areas; and
a selection unit configured to select the AF frame to be focused using the priority,
wherein for each AF frame, based on the pair of image signals acquired from each of the first and second focus detection areas corresponding to the AF frame, the determination unit determines whether or not a predetermined object is included within the AF frame, and by using results of these determinations, the determination unit determines the priority of the plurality of AF frames.

12. The image pickup apparatus according to claim 11, wherein the pair of image signals are acquired based on signals generated by the image sensor.

13. The image pickup apparatus according to claim 11, wherein reliability of the defocus amount includes contrast information based on the acquired pair of image signals.

14. The image pickup apparatus according to claim 11, wherein the at least one processor further functions as an AF frame setting unit configured to two-dimensionally set the plurality of AF frames.

15. The image pickup apparatus according to claim 11, wherein the at least one processor further functions as a focus detecting area setting unit configured to set the first and second focus detecting areas.

16. A focus detecting method comprising:

acquiring a defocus amount using a pair of image signals corresponding to each of a first focus detecting area and a second focus detecting area larger than the first focus detecting area set for each of plurality of AF frames, the first and second focus detection areas each including the corresponding AF frame thereinside;

determining a priority of the plurality of AF frames using the pair of image signals acquired from each of the first and second focus detecting areas; and selecting the AF frame to be focused using the priority, wherein in the determining, whether or not a predetermined object is included within the AF frame is determined for each AF frame based on the pair of image signals acquired from each of the first and second focus detection areas corresponding to the AF frame, and by using results of these determinations, the priority of the plurality of AF frames is determined.

17. The focus detecting method according to claim 16, wherein the pair of image signals are acquired based on signals generated by an image sensor.

18. The focus detecting method according to claim 16, wherein reliability of the defocus amount includes contrast information based on the acquired pair of image signals.

19. The focus detecting method according to claim 16, further comprising two-dimensionally setting the plurality of AF frames.

20. The focus detecting method according to claim 16, setting the first and second focus detecting areas.

* * * * *